(12) United States Patent
Ferris et al.

(10) Patent No.: US 8,612,489 B2
(45) Date of Patent: Dec. 17, 2013

(54) LOSSLESS TRANSFORMATION OF XBRL INSTANCE TO XML DATA MODEL INSTANCE

(75) Inventors: Christopher B. Ferris, Northbridge, MA (US); Min Li, Haidian District (CN); John V. Meegan, Ridgefield, CT (US); Michael G. Rowling, Victoria (CA); Craig A. Statchuk, North Gower (CA); Zhong Tian, Haidian District (CN); Xiao Feng Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/183,133

(22) Filed: Jul. 14, 2011

(65) Prior Publication Data

US 2013/0018923 A1   Jan. 17, 2013

(51) Int. Cl.
*G06F 7/00* (2006.01)
*G06F 17/30* (2006.01)

(52) U.S. Cl.
CPC .................. *G06F 17/30926* (2013.01)
USPC ....................................................... 707/803

(58) Field of Classification Search
None
See application file for complete search history.

(56) References Cited

U.S. PATENT DOCUMENTS

| | | | |
|---|---|---|---|
| 6,601,071 B1 | 7/2003 | Bowker et al. | |
| 7,472,346 B2 | 12/2008 | Baelen | |
| 7,630,956 B2 | 12/2009 | Wyatt et al. | |
| 8,230,332 B2 * | 7/2012 | Summers et al. | 715/239 |
| 2003/0041077 A1 | 2/2003 | Davis et al. | |
| 2004/0029114 A1 | 2/2004 | Mack et al. | |
| 2005/0154628 A1 | 7/2005 | Eckart et al. | |
| 2005/0182777 A1 | 8/2005 | Block et al. | |
| 2005/0183002 A1 | 8/2005 | Chapus | |
| 2006/0184539 A1 | 8/2006 | Blake et al. | |
| 2006/0242181 A1 | 10/2006 | Mueller-Klingspor | |
| 2007/0022093 A1 | 1/2007 | Wyatt et al. | |
| 2007/0078877 A1 | 4/2007 | Ungar et al. | |
| 2007/0192265 A1 | 8/2007 | Chopin et al. | |
| 2007/0288253 A1 | 12/2007 | Cobb et al. | |
| 2008/0189206 A1 | 8/2008 | Choi et al. | |
| 2008/0201319 A1 | 8/2008 | McNamar | |
| 2009/0144611 A1 | 6/2009 | Rohan et al. | |
| 2010/0031141 A1 * | 2/2010 | Summers et al. | 715/239 |
| 2012/0239610 A1 * | 9/2012 | Binstock et al. | 707/602 |

FOREIGN PATENT DOCUMENTS

| | | |
|---|---|---|
| CA | 2606344 | 11/2006 |
| WO | WO-2005055001 | 6/2005 |

OTHER PUBLICATIONS

U.S. Appl. No. 61/453,821, filed Mar. 17, 2011.*

* cited by examiner

*Primary Examiner* — Jay Morrison
(74) *Attorney, Agent, or Firm* — DeLizio Gilliam, PLLC

(57) ABSTRACT

For each of a plurality of concepts indicated in an XBRL schema associated with an XBRL instance, concept relationship information is determined. The concept relationship information is determined from the XBRL schema, context information indicated in the XBRL instance, and at least one of a plurality of files that constitute a taxonomy set for the XBRL instance. Attribute information is determined for each concept based, at least in part, on the XBRL schema and at least one of the files that constitute the taxonomy set. An XML document is generated with XML elements structured in accordance with the concept relationship information. Each of the XML elements is populated with corresponding ones of XBRL facts to yield the structured XML data model instance.

18 Claims, 6 Drawing Sheets

LOSSLESS TRANSFORMATION OF XBRL INSTANCE TO XML DATA MODEL INSTANCE

BACKGROUND

Embodiments of the inventive subject matter generally relate to the field of computing, and, more particularly, to transforming an XBRL instance into an XML data model instance.

The eXtensible Business Reporting Language (XBRL) is a language for the electronic communication of business and financial data. XBRL is one of a family of XML languages.

XBRL defines a syntax in which a fact can be reported as the value of a well defined reporting concept within a particular context. The XBRL framework splits business reporting information into two components: XBRL instances and taxonomies.

XBRL instances contain the facts being reported while the taxonomies define the concepts being communicated by the facts. The combination of an XBRL instance and its supporting taxonomies, and additional linkbases constitute an XBRL business report.

A taxonomy is comprised of an eXtensible Markup Language (XML) Schema and all of the linkbases contained in that schema or that extend the schema. XBRL defines an approach for extending an XML Schema using the annotation/appInfo feature to incorporate references to XBRL linkbases. The XML schema is referred to as a taxonomy schema. The linkbases and the taxonomy schema are referenced in accordance with the XML Linking Language (Xlink). Xlink is a specification that defines functions for creating internal and external references, or links, within and between XML documents. Xlink provides for simple links and extended links Simple links connect two resources. Extended links connect multiple resources, remote or local, with multiple arcs. An arc is information about an origin, destination, and link between two resources.

In XBRL terminology, a concept is a definition of a reporting term. Concepts manifest as XML Schema element definitions. In the taxonomy schema, a concept is given a concrete name and a type. The type defines the kind of data types allowed for facts measured according to the concept definition. For example, a "cash" concept would typically have a monetary type. This declares that when cash is reported, its value will be monetary. In contrast, a "accountingPoliciesNote" concept would typically have a string type so that, when the "accountingPoliciesNote" is reported in an XBRL instance, its value would be interpreted as a string of characters. Additional constraints on how concepts can be used are documented by additional XBRL attributes on the XML Schema element definitions that correspond to the concepts.

The linkbases in a taxonomy further document the meaning of the concepts by expressing relationships between concepts (inter-concept relationships) and by relating concepts to their documentation. A linkbase is a collection of extended links. There are five different kinds of extended links used in XBRL taxonomies to document concepts: definition, calculation, presentation, label and reference. The first three types of extended link express inter-concept relationships, and the last two express relationships between concept and their documentation. The linkbases are typically separate documents from the taxonomy schema. The taxonomy schema contains a linkbaseRefto point to a linkbase document if the linkbase is to be part of the taxonomy built around the taxonomy schema.

While a taxonomy defines reporting concepts, it does not contain the actual values of facts based on the defined concepts. The fact values are contained in XBRL instances and are referred to as "facts." Besides the actual value of a fact, such as "cash is 500,000," the XBRL instance provides contextual information necessary for interpreting the fact values. For numeric facts, the XBRL instance also documents measurement accuracy and measurement units.

An XBRL instance can be supported by more than one taxonomy. Also, taxonomies can be interconnected, extending and modifying each other in various ways. Generally, it is necessary to consider multiple related taxonomies together when interpreting an XBRL instance. The set of related taxonomies is called a Discoverable Taxonomy Set (DTS). A DTS is a collection of taxonomy schemas and linkbases.

SUMMARY

Embodiments include a method for transforming an extensible business reporting language (XBRL) instance into a structured extensible markup language (XML) data model instance. For each of a plurality of concepts indicated in an XBRL schema associated with an XBRL instance, concept relationship information is determined. The concept relationship information is determined from the XBRL schema, context information indicated in the XBRL instance, and at least one of a plurality of files that constitute a taxonomy set for the XBRL instance. Attribute information is determined for each concept based, at least in part, on the XBRL schema and at least one of the files that constitute the taxonomy set. An XML document is generated with XML elements structured in accordance with the concept relationship information. Each of the XML elements is populated with corresponding ones of XBRL facts to yield the structured XML data model instance.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
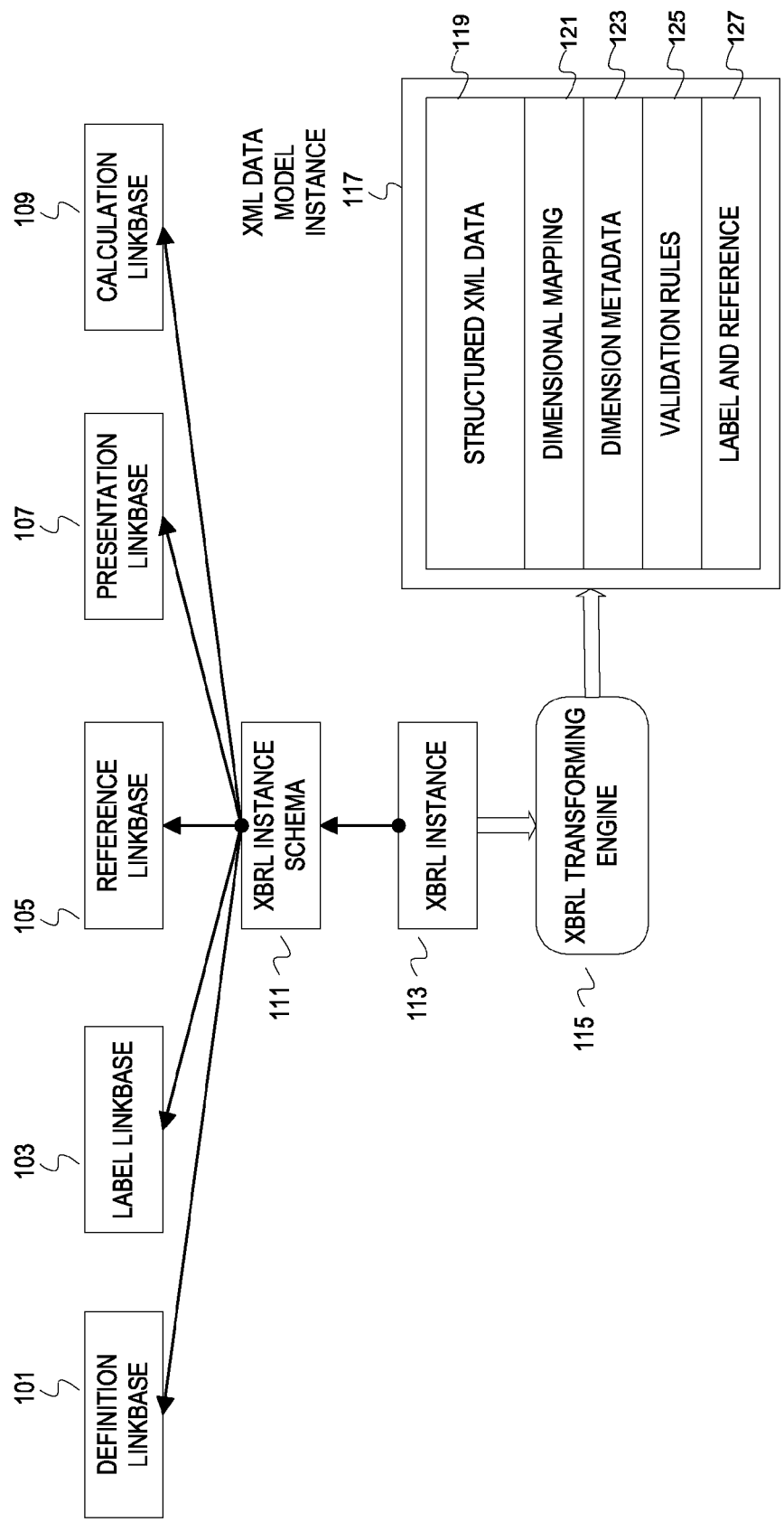
FIG. 1 depicts a conceptual diagram of an example transformation of an XBRL instance into an XML data model instance.

The description that follows includes example systems, methods, techniques, instruction sequences and computer program products that embody techniques of the present inventive subject matter. However, it is understood that the described embodiments may be practiced without these specific details. For instance, although examples refer to the eXtensible Markup Languge (XML), embodiments are not necessarily limited to transforming an XBRL instance into an XML data model instance. Also, the embodiments are not limited to XBRL. Embodiments can also encompass similar XML based language/specifications that relate to other industries, for example the health industry with medicine based taxonomies. In other instances, well-known instruction instances, protocols, structures and techniques have not been shown in detail in order not to obfuscate the description.

XBRL separates the business facts from the relationship information, or structural information, in an XBRL instance. Although conceptually viewed as a single entity, the XBRL instance file that contains the business facts is separate from the XBRL files that contain the DTS documents, which express the relationships among concepts. This separation of business facts from relationship information introduces complexity for tools that consume or read an XBRL instance. The possibility that multiple schemas and linkbases aggregately influence the relationships among concepts also adds to the complexity. Further, an XBRL instance may also include multi-dimension data in accordance with the XBRL Dimensions specification, which adds another degree of complexity.

A transformation engine can transform a complex XBRL instance into an XML data model instance consumable and readable by a tool that cannot process an XBRL instance. The transformation engine transforms the complex collection of files that constitute an XBRL instance into one or more XML documents that express the facts (referred to hereinafter as "business data") and hierarchical relationships or structure for the business data. The one or more XML documents will be referred to hereinafter as an XML data model instance. The one or more XML documents that express the structure of an XBRL instance will be referred to herein as an XML data model. In other words, an XML data model populated with business data from an XBRL instance is an XML data model instance. The transformation normalizes Xlink references. Normalizing the Xlink references involves transforming each arc of an extended link into parent-child hierarchical relationships compliant with XML. The transformation also masks the complexity of the XBRL taxonomy, and simplifies processing of the business data. The transformation reduces the total number of files for processing, which further simplifies processing of the XBRL instance. The transformation of concept relationships into structured elements in an XML document not only allows the business data to be consumed and/or read by an XML-based application or tool, but also allows for the XML-based tool to implement user selection of presentation linkbases and contexts. In addition, the flattening of dimensional metadata from the XBRL instance simplifies dimension discovery processing by allowing discovery of structure indicated in the flattened dimensional metadata with the XQuery language or XML Path (XPath) language. Furthermore, lossless transformation of an XBRL instance preserves the information from the XBRL instance and allows for a reverse transformation.

FIG. 1 depicts a conceptual diagram of an example transformation of an XBRL instance into an XML data model instance. An XBRL instance 113 includes an external reference to an XBRL instance schema 111. The XBRL instance scheme 111 includes external references to a definition linkbase 101, a label linkbase 103, a reference linkbase 105, a presentation linkbase 107, and a calculation linkbase 109. These linkbases are defined in the XBRL specification. Although these 5 linkbases are depicted, embodiments are not so limited. Some of the standard linkbases may not be used by an XBRL instance. Also, an XBRL instance can reference multiple schemas. The XBRL instance scheme 111 could reference other schemas. In addition, externally referenced documents could be embedded within the XBRL instance schema 111. The term "document" is used herein to refer to a well-defined unit of XBRL or XML. A well-defined unit of XBRL or XML may be any of the following: a segment of a file; section of a file; a file; or an arbitrary collection of segments, sections, or files.

An XBRL transforming engine 115 receives the XBRL instance 113 as input. The transforming engine 115 parses the XBRL instance 113, and resolves the external references (e.g., Xlinks) to discover the externally referenced documents that constitute the discoverable taxonomy set (i.e., the XBRL schema and linkbases) for the XBRL instance 113. The XBLR transforming engine 115 outputs an XML data model instance 117.

The XML data model instance 117 comprises a structured XML data document 119, a dimension mapping document 121, dimensional metadata 123, a validation rules document 125, and labels and references document 127. The structured XML data document 119 comprises the business data from the XBRL instance 113 with context information. The transforming engine 115 generates the structured XML data document 119 with the business data structured in accordance with the concept relationship information discovered from the XBRL instance schema 111 and linkbases that may also have concept relationship information. This example illustration assumes that the definition linkbase 101 and the presentation linkbase 107 indicate concept relationship information that affects the hierarchical organization of elements in the structured XML data document 119 that describe the business data.

The dimensional metadata 123 is a schema file that holds the dimensional metadata carried over from the XBRL instance 113. The transforming engine transforms the dimensional metadata 123 to preserve a restricted hierarchy in an XSD file in accordance with the definition linkbase 101, but compliant in an XSD format. For example, a dimensional element may be defined with multiple arcs in accordance with Xlink. When transformed, the dimensional element transforms into a parent element and the resources referenced by the arcs transforms into child elements of the parent dimensional element, thus preserving the hierarchical structure. Dimensional metadata may indicate multiple hierarchies (or views) connecting concept elements by different logical groupings. When transformed into the structured XML data model instance, the multiple hierarchies transform into different trees in the mapping document.

The dimension mapping document 121 is an XML document that describes the mapping relationship between the structured XML data document 119 and the dimensional metadata. The dimension mapping document 121 describes the mapping relationship like records in a relational database, in which each record corresponds to an XBRL concept that is an element in the structured XML data document. The dimension mapping document 121 can be maintained in a separate XML file or merged into a file that contains the structured XML data document 119. If merged into the structured XML data document 119, then a transforming engine writes the dimension mapping for each XML element that corresponds to an XBRL concept element to the structured XML data document 121 as a child element(s) of the XML element.

The validation rules 121 correspond to the XBRL calculation linkbase 109. The transforming engine 115 can use different XML technologies to describe the validation rules (e.g., Schematron standard compliant technology, Xforms format compliant technology) The validation rules 121 can be merged into the structured XML data document 119 or maintained in a separate XML document. For example, a transforming engine writes the validation rules 121 as attribute values for corresponding XBRL concept elements as represented in the structured XML data document 119. Other embodiments store the validation rules in a separate portion of the transformed, structured XML data model instance.

The label and reference documents 127 are XML documents that hold the label information and reference information for XBRL concepts. A transforming engine derives the label information and reference information from the label linkbase 103 and the reference linkbase 105, respectively. A transforming engine can merge the label and reference documents 127 into a file that comprises the structured XML data document 119 as depicted in FIG. 1, or maintain them in separate files.

Figure 2:
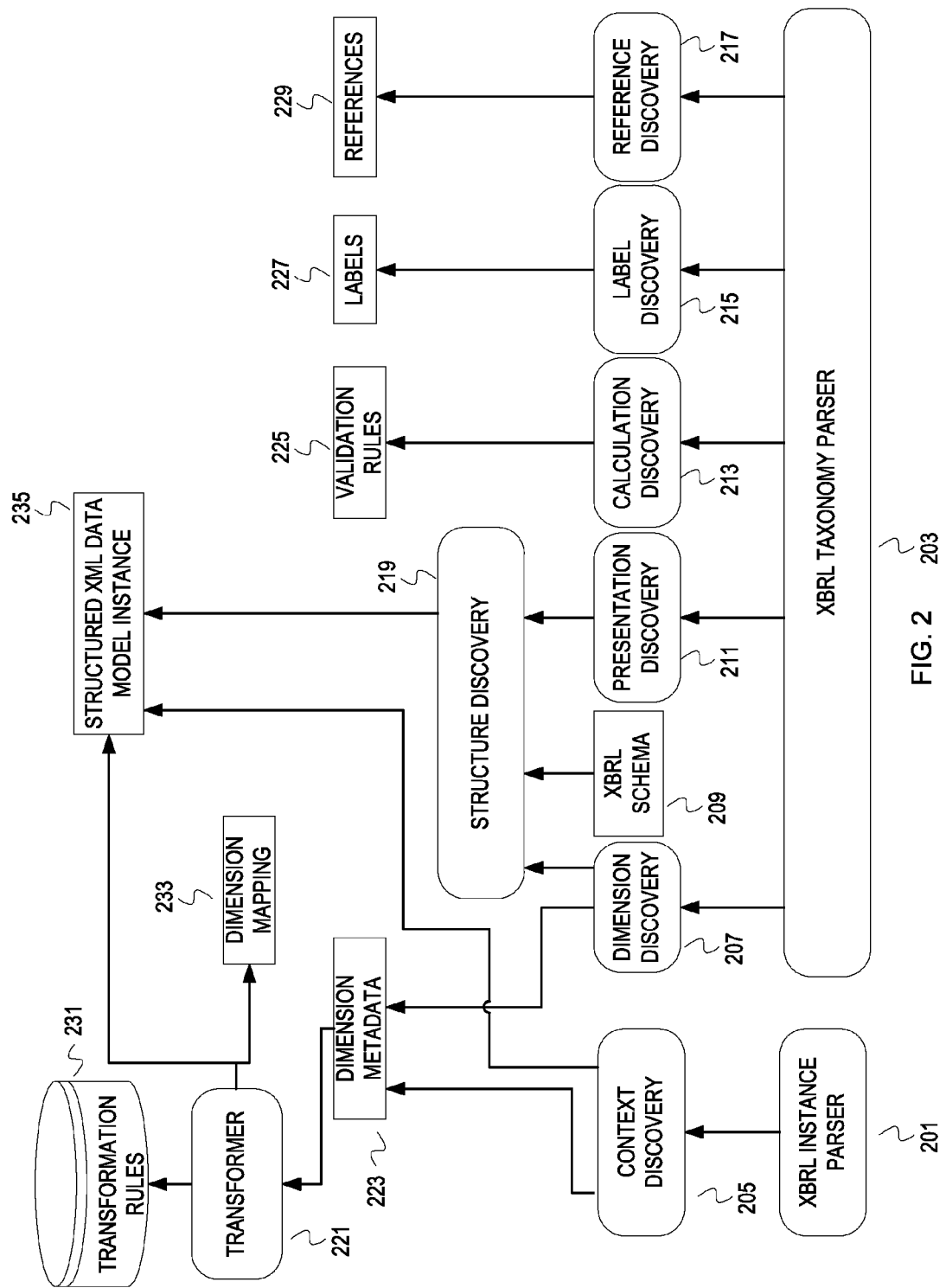
FIG. 2 depicts a conceptual diagram of an example transforming engine.

FIG. 2 depicts a conceptual diagram of an example transforming engine. The transforming engine comprises an XBRL instance parser 201 and an XBRL taxonomy parser 203. The XBRL instance parser 201 and the XBRL taxonomy parser 203 parse the XML files of an XBRL instance. The XBRL instance parser 201 parses the XBRL instance and supplies output from parsing the XBRL instance to a context discovery module 205. The XBRL taxonomy parser 203 parses files of the discovered taxonomy set of the XBRL instance, and supplies input to several modules. Parsing the files of the DST can include traversing external references in the linkbases.

The modules depicted as receiving input from the XBRL taxonomy parser 203 in FIG. 2 include the following: a dimension discovery module 207, a presentation discovery module 211, a calculation discovery module 213, a label discovery module 215, and a reference discovery module 217. These several modules and the context discovery module 205 discover semantic information about the XBRL instance with the output from the XBRL instance parser 201 and the XBRL taxonomy parser 203.

The calculation discovery module 213, the label discovery module 215, and the reference discovery module 217 each discover information from corresponding linkbases. The calculation discovery module 213 parses information in a calculation linkbase to derive validation rules 225 for business data in the XBRL instance. The label discovery module 215 parses information in a label linkbase to derive labels 227 and/or aliases relevant to the XBRL concepts in the XBRL instance. The reference discovery module 217 parses information in a reference linkbase to derive references 229 relevant to the XBRL concepts in the XBRL instance.

The context discovery module 205 discovers context definitions, recognizes the context binding of instance data, and finds the dimension constraints of each context. To discover the context binding of business data, the context discovery module 205 evaluates context information in an XBRL instance that affects concepts (e.g., determines attributes and attribute values for concepts being transformed). The context discovery module 205 also determines dimension constraints indicated for each context in the XBRL instance in accordance with rules that govern the transformation. The transformer 221 writes the contextual definitions into a structured XML data model instance 235. The transformer 221 uses the context information that affects concept relationships to structure the elements of the structured XML data model instance 235. An author of the dimension constraints can indicate the dimension constraints within the XBRL instance or in an external file referenced by the XBRL instance. The dimension discovery module 207 parses dimensional metadata in the XBRL instance to determine information for building dimensional metadata. In this illustration, the dimension discovery module 207 parses the presentation linkbase and the definition linkbase to determine dimensional metadata indicated in those linkbases. The dimension discovery module 207 may also discover dimensional metadata in the XBRL schema 209. The dimension discovery module 207 discovers dimensional metadata by recognizing dimensional tags (e.g., hypercube). The context discovery module 205 and the dimension discovery module 207 supply the information to a transformer module 221.

The presentation discovery module 211 builds structural information with concept relationship information determined from a presentation linkbase. The presentation linkbase provides one view of many possible views of the data. The structural information is not limited to the view of the presentation linkbase. The structural information indicates parent-child relationships of the XBRL concept elements to be indicated in the XML data model instance. The concept relationship information determined by the dimension discovery module 207 and the presentation discovery module 211 are input along with an XBRL schema 209 into a structure discovery module 219.

The structure discovery module 219 and the transformer module 221 transform the input semantic data into an XML data model instance. The XBRL schema 209 and information from the context discovery module 205, dimension discovery module 207, and presentation discovery module 211 are collectively referred to herein as "semantic data." The structure discovery module 219 collects structure information output by the dimension discovery module 207 and the presentation discovery module 211. The structure discovery module parses the XBRL schema 209 to determine structural information of the XBRL instance. The structure discovery module 219 transforms the concept relationship information and dimension constraints into parent-child relationships to generate a structured XML data model. The transformer module 221 uses the information from the context discovery module 205 and the dimension discovery module 207 to generate dimensional metadata 223. The transformer module 221 parses the dimensional metadata 223 to generate dimension mapping 233. The transformer module 221 may use the dimension mapping 233 to hierarchically structure some elements for the structured XML data model in accordance with transformation rules 231. The transformer module 221 populates the structured XML data model with business data in accordance with the transformation rules 231 to generate a structured XML data model instance 235. The transformer module 221 also receives the validation rules 225, labels 227, and references 229, and includes them in the structured XML data model instance 235.

FIG. 2 is intended to aid in understanding the inventive subject matter and should not be used to limit embodiments of the inventive subject matter. A transforming engine can be implemented in accordance with a variety of techniques. Some of the functionality of the depicted modules may be implemented in hardware (e.g., programmable logic or an application specific integrated circuit). Some of the modules can be implemented in accordance with software as a service. The modules may be functions/procedures of a single program or multiple programs. In addition, the modules can operate in parallel or in serial different than depicted within the confines of the input/output dependencies. Furthermore, embodiments are not limited to constructing an XML data model into which business data from the XBRL instance is imported to yield an XML data model instance. Some embodiments construct a structured XML data model instance directly from the business data in the XBRL instance. Some embodiments interleave constructing the structure and inserting the business data.

Figure 3:
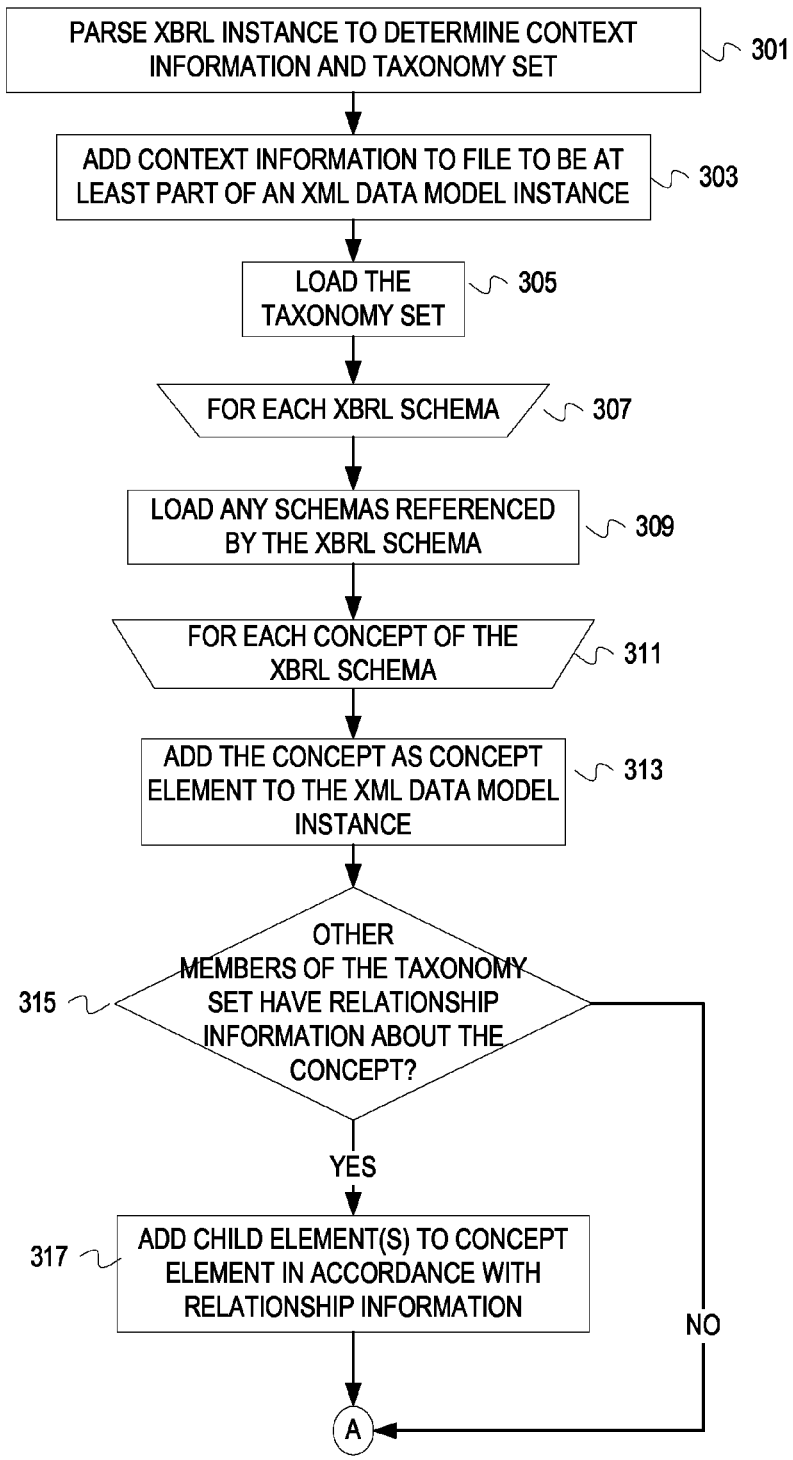
FIGS. 3-4 depict flowcharts of example operations for transforming an XBLR instance into a structured XML data model instance.
Figure 4:
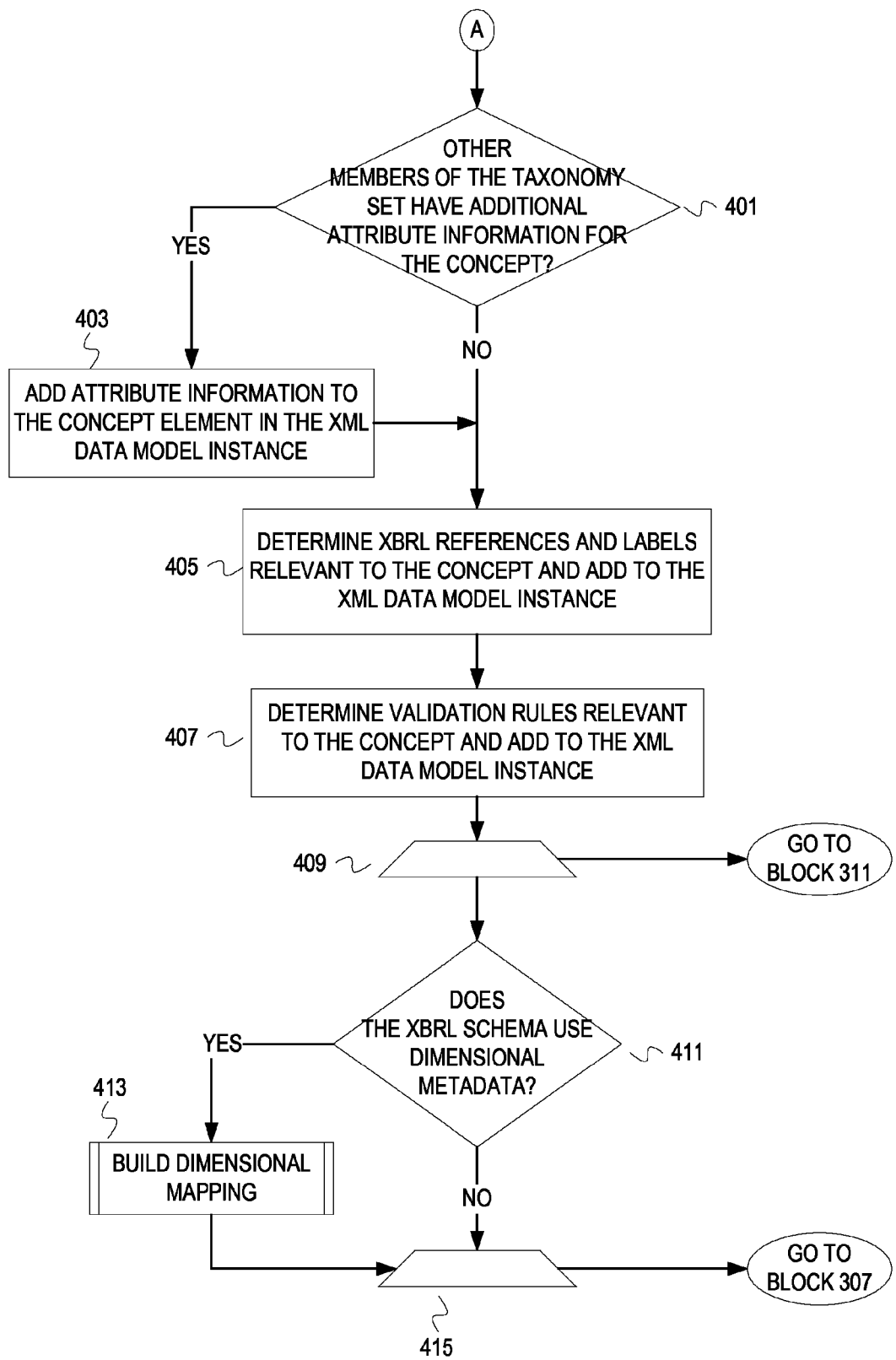

FIGS. 3-4 depict flowcharts of example operations for transforming an XBLR instance into a structured XML data model instance. At block 301, a transforming engine parses an XBLR instance to determine context information and a discoverable taxonomy set. For example, a transformation engine locates tags that identify context information and tags that identify one or more references to externally defined schemas for the XBLR instance.

At block 303, the transforming engine adds the context information to a file that will become at least part of an XML data model instance. For example, the transforming engine writes the context information in accordance with XML into a XML file. For simplicity, the file(s) will be referred to as the XML data model instance for the remainder of FIGS. 3-4.

At block 305, the transforming engine loads the taxonomy set. For example, a transforming engine traverses the external references to load the various files of the XBLR instance into memory and/or storage. Examples of the files include XBLR schema files and linkbase files.

At block 307, the transforming engine begins operations for each XBRL schema loaded via the external reference(s) in the XBRL instance.

At block 309, the transforming engine loads any schemas referenced by the XBRL schema. While parsing the XBRL schema, embodiments can discover additional external references to files that affect structure of the XML data model instance being created. A recursive type or processing occurs if the XBRL schema includes external references to other schemas.

At block 311, the transforming engine begins operations begin for each concept defined of the XBRL schema.

At block 313, the transforming engine adds the concept as a concept element to the XML data model instance.

At block 315, the transforming engine determines if other members of the taxonomy set have concept relationship information about the concept. For example, a transforming engine searches each of the members of the taxonomy set that could have concept-relationship information that affects the concept. Embodiment can disregard the calculation, label, and reference linkbases at this point. Embodiments can iteratively refine structural information collected from each of the taxonomy set members for the concept. Embodiments can also aggregate the structural information, and then synthesize the aggregated information to yield a comprehensive view of the structure of the concept as defined by the taxonomy. If none of the other members of the taxonomy set have relationship information about the concept, the flow continues to block 401 of FIG. 4. Otherwise, the flow continues to block 317.

At block 317, the transforming engine adds a child element to the concept element in accordance with relationship information. In some cases, the child element is another concept element defined in the XBRL schema or a concept element defined in the other member of the taxonomy set. In some cases, an author of the XBRL instance defines the child element in both the XBRL schema and the other member of the taxonomy set. But the other member of the taxonomy set has relationship information that relegates the concept element to be a child element instead of a parent element.

FIG. 4 continues the flowchart of example operations from FIG. 3. At block 401, the transforming engine determines whether other members of the taxonomy set have additional attribute information for the concept. For example, the transforming engine determines that the definition linkbase indicates information to be set as tags and values for the concept element in the XML data model instance. If no other members of the taxonomy set have relevant attribute information, then control flows to block 405. Otherwise, control flows to block 403.

At block 403, attribute information is added to the concept element in the XML data model instance. For example, the transforming engine writes attribute tags and attribute values for the concept element. Control flows from block 403 to block 405.

At block 405, the transforming engine determines XBRL references and labels relevant to the concept element, and adds corresponding metadata to the XML data model instance. For example, the transforming engine determines that the reference linkbase indicates references relevant to the concept and that the label linkbase indicates labels and/or aliases relevant to the concept.

At block 407, the transforming engine determines validation rules relevant to the concept, and adds metadata for the validation rules to the XML data model instance. For example, the transforming engine determines information in a calculation linkbase that corresponds to the concept. In some cases, the transforming engine adds executable/interpretable code that implements a validation rule.

At block 409, the transforming engine determines whether there are additional concepts to process in the XBRL schema. If so, then control returns to block 311. If not, then control continues to block 411.

At block 411, the transforming engine determines whether the XBRL schema uses dimensional metadata. If the XBRL schema uses dimensional metadata, then control flows to block 413. At block 413, the transforming engine builds a dimension mapping document. From block 413, control flows to block 415. If the transforming engine determines at block 411 that the XBRL schema does not use dimensional metadata, then control flows to block 415. At block 415, the transforming engine determines whether another XBRL schema remains to be processed. If so, then control returns to block 307.

Figure 5:
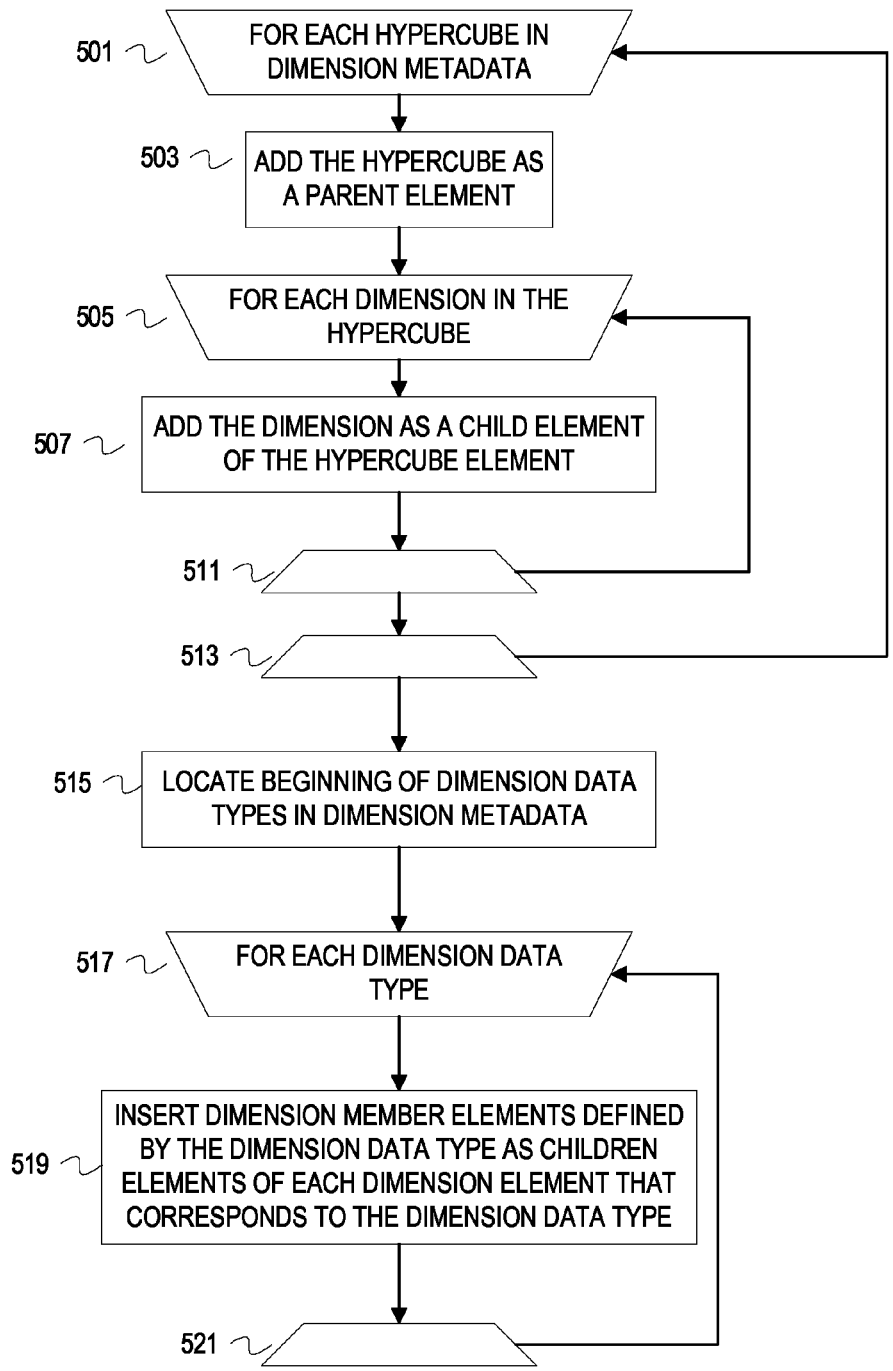
FIG. 5 depicts a flowchart of example operations for building a dimension mapping document separate from the structured XML data in a structured XML data model instance.

FIG. 5 depicts a flowchart of example operations for building a dimension mapping document separate from the structured XML data in a structured XML data model instance. At block 501, a transforming engine begins operations for each hypercube indicated in dimensional metadata of an XBRL schema. At block 503, the transforming engine adds the hypercube as a parent element in the mapping document.

At block 505, the transforming engine begins operations for each dimension indicated for the hypercube in the dimensional metadata. At block 507, the dimension is added as a child element to the hypercube element. For example, the transforming engine nests an element, which describes the dimension, within the element that describes the hypercube.

At block 511, the transforming engine determines whether there is another dimension of the hypercube. If so, processing returns to block 505 for the next dimension of the hypercube. Otherwise, control flows to block 513. At block 513, the transforming engine determines whether another hypercube is indicated in the dimensional metadata. If the dimensional metadata indicates another hypercube, then control returns to block 501. If the hypercubes have been processed, then control flows to block 515.

At block 515, the transforming engine locates a beginning of dimension data type definitions in the dimensional metadata. When the transforming engine creates the dimensional metadata from the XBRL dimension data, the transforming engine creates data type definitions for each of the dimensions after creating the part of the dimensional metadata that indicates the relationships between hypercubes and dimension, although embodiments are not confined to this implementation. The transforming engine creates names for the dimension data types that reflect the correspondence with the dimensions. The definitions of the data types indicate the dimension members for each dimension.

At block 517, the transforming engine begins operations for each dimension data type.

At block 519, the transforming engine inserts the dimension member elements defined by the dimension data type as children elements. The transforming engine inserts the dimension member elements as children for each dimension element that corresponds to the dimension data type.

At block 521, the transforming engine determines whether additional dimension data types remain to be processed. If so, then control returns to block 517.

Embodiments can perform multiple passes over the DST of an XBRL instance to determine refinements or restructuring to an XML data model instance. Embodiments can delay importing the business data into a structured XML model until after refinements/restructuring complete. Embodiments can also refine or restructure an XML data model that already hosts business data. Although the example operations are described as being performed by a transforming engine, embodiments are not limited to a particular implementation or program for implementing the functionality represented by the flowcharts.

The flowcharts depicted in the figures are intended to aid in understanding the inventive subject matter, and should not be used to limit embodiments of the inventive subject matter. Embodiments can perform additional operations, fewer operations, operations in parallel, in a different order, and so forth. For instance, embodiments can perform the functionality represented by blocks 405 and 407 in parallel or before the functionality represented by the blocks subsequent to block 313. As another example, embodiments are not limited to processing dimensional metadata in a linear fashion as suggested in FIG. 5. Embodiments can establish pointers into dimensional metadata and construct the dimension mapping document linearly while going back and forth between the two sections of the dimensional metadata. Moreover, embodiments are not limited to creating the dimensional metadata in the different sections as described above.

A transforming engine can be implemented to reverse the transformation. A financial institution or third party reviewing entity may not have a capability or desire to view and/or modify a business reporting statement encoded in XBRL. The entity transforms the business reporting statement from the XBRL instance to a structured XML data model instance. The entity uses an XML based tool to view or modify the business data. After the review and/or modification of business data is complete, the entity uses the transforming engine to transform the structured XML data model instance back into an XBRL instance. In addition, a transforming engine can transform an XBRL instance at different granularities. A configuration value is set for a particular granularity. For example, a user or configuration file specifies a concept within an XBRL instance to transform. The transforming engine transforms the specified concept and corresponding subordinate concepts as described above. To illustrate, a user specifies a RevenueTable to be transformed instead of all concepts in a presentation linkbase. The transforming engine transforms the business data that corresponds to the concepts bound to the RevenueTable in accordance with the relationship information defined for the RevenueTable. The transform engine can transform at different levels of granularity. For instance, the transform engine can transform a RegionalSalesTable, which is defined as a subordinate concept or child concept of the RevenueTable concept.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
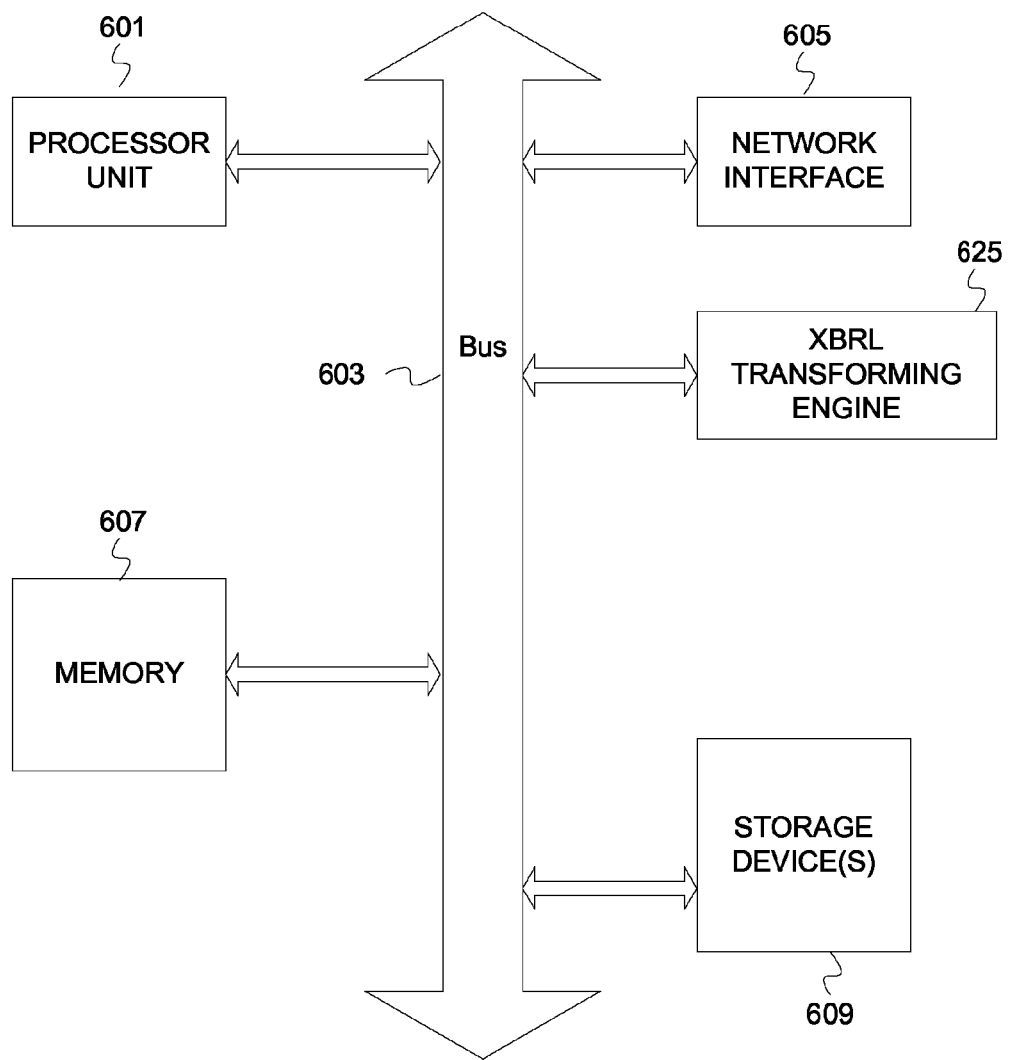
FIG. 6 depicts an example computer system.

FIG. 6 depicts an example computer system. A computer system includes a processor unit 601 (possibly including multiple processors, multiple cores, multiple nodes, and/or implementing multi-threading). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM) or any one or more of the above already described possible realizations of machine-readable media. The computer system also includes a bus 603 (e.g., PCI, ISA, PCI-Express, HyperTransport®, InfiniBand®, NuBus), a network interface 605 (e.g., an ATM interface, an Ethernet interface, a Frame Relay interface, SONET interface, wireless interface), and a storage device(s) 609 (e.g., optical storage, magnetic storage). The system also comprises an XBLR transforming engine 625 that losslessly transforms an XBRL instance into an XML data model instance. The transforming functionality may be partially (or entirely) implemented in hardware and/or on the processing unit 601. For example, the functionality may be implemented with an application specific integrated circuit, in logic implemented in the processing unit 601, in a co-processor on a peripheral device or card. Further, realizations may include fewer or additional components not illustrated in FIG. 6 (e.g., video cards, audio cards, additional network interfaces, peripheral devices). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for lossless transformation of an XBRL instance into an XML data model instance as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for transforming an extensible business reporting language (XBRL) instance into a structured extensible markup language (XML) data model instance, the method comprising:
for each of a plurality of concepts indicated in an XBRL schema associated with the XBRL instance,
determining concept relationship information for the concept from the XBRL schema, context information indicated in the XBRL instance, and at least one of a plurality of files that constitute a taxonomy set for the XBRL instance;
determining attribute information for the concept based, at least in part, on the XBRL schema and at least one of the files that constitute the taxonomy set;
generating an XML document with XML elements structured in accordance with the concept relationship information, wherein the XML elements correspond to the plurality of concepts and have attributes set based, at least in part, on the attribute information;
populating each of the XML elements with corresponding ones of XBRL facts to yield the structured XML data model instance, wherein the XBRL instance indicates the XBRL facts and the XML data model instance comprises at least the XML document;
retrieving an XBRL dimension document via a second reference indicated in the taxonomy set, the XBRL dimension document including at least one hypercube having a plurality of dimensions;
adding a parent element to an XML dimension mapping document, the parent element corresponding to the hypercube; and
adding to the XML dimension document one or more child elements of the parent element, the one or more child elements representing one or more dimensions in the hypercube.

2. The method of claim 1 further comprising:
retrieving an XBRL dimension document via a second reference indicated in the taxonomy set;
generating XBRL dimensional metadata from the XBRL dimension document; and
generating an XML dimension mapping document with the XBRL dimensional metadata and dimension constraints indicated in the context information.

3. The method of claim 1 further comprising:
parsing the XBRL instance, wherein the XBRL instance comprises the XBRL facts, the context information, and a reference to the XBRL schema;
determining the reference to the XBRL schema based on said parsing the XBRL instance;
retrieving the XBRL schema via the reference;
parsing the XBRL schema;

determining the plurality of concepts indicated in the XBRL schema and a plurality of references to the files that constitute the taxonomy set for the XBRL instance based on said parsing the XBRL schema;

retrieving the plurality of files that constitute the taxonomy set via the plurality of references.

4. The method of claim 1 further comprising:

determining additional information relevant to the plurality of concepts from the plurality of files; and generating a set of one or more XML documents with metadata that represent the additional information.

5. The method of claim 4, wherein the additional information comprises reference information from a reference linkbase, validation rules from a calculation linkbase, and labels from a label linkbase, wherein the plurality of files comprise the reference linkbase, the calculation linkbase, and the label linkbase.

6. The method of claim 1, wherein the at least one of the plurality of files that constitute the taxonomy set for the XBRL instance comprise at least one of a presentation linkbase and a definition linkbase.

7. The method of claim 1 further comprising generating a second XML document that preserves the structure of the XBRL instance, wherein the structured XML data model instance also comprises the second XML document.

8. The method of claim 7 further comprising transforming a second XML data model instance into a second XBRL instance using the second XML document, wherein the second XML data model instance is a modified version of the XML data model instance.

9. A computer program product for transforming an extensible business reporting language (XBRL) instance into a structured extensible markup language (XML) data model instance the computer program product comprising:

a computer readable storage medium having computer usable program code embodied therewith, the computer usable program code comprising a computer usable program code configured to:

for each of a plurality of concepts indicated in an XBRL schema associated with the XBRL instance, determine concept relationship information for the concept from the XBRL schema, context information indicated in the XBRL instance, and at least one of a plurality of files that constitute a taxonomy set for the XBRL instance;

determine attribute information for the concept based, at least in part, on the XBRL schema and at least one of the files that constitute the taxonomy set;

generate an XML document with XML elements structured in accordance with the concept relationship information, wherein the XML elements correspond to the plurality of concepts and have attributes set based, at least in part, on the attribute information;

populate each of the XML elements with corresponding ones of XBRL facts to yield the structured XML data model instance, wherein the XBRL instance indicates the XBRL facts and the XML data model instance comprises at least the XML document;

retrieve an XBRL dimension document via a second reference indicated in the taxonomy set, the XBRL dimension document including at least one hypercube having a plurality of dimensions;

add a parent element to an XML dimension mapping document, the parent element corresponding to the hypercube;

add to the XML dimension document one or more child elements of the parent element, the one or more child elements representing one or more dimensions in the hypercube.

10. The computer program product of claim 9, wherein the computer usable program code is further configured to:

retrieve an XBRL dimension document via a second reference indicated in the taxonomy set;

generate XBRL dimensional metadata from the XBRL dimension document; and generate an XML dimension mapping document with the XBRL dimensional metadata and dimension constraints indicated in the context information.

11. The computer program product of claim 9, wherein the computer usable program code is further configured to:

determine additional information relevant to the plurality of concepts from the plurality of files; and generate a set of one or more XML documents with metadata that represent the additional information.

12. The computer program product of claim 11, wherein the additional information comprises reference information from a reference linkbase, validation rules from a calculation linkbase, and labels from a label linkbase, wherein the plurality of files comprise the reference linkbase, the calculation linkbase, and the label linkbase.

13. The computer program product of claim 9, wherein the at least one of the plurality of files that constitute the taxonomy set for the XBRL instance comprises at least one of a presentation linkbase and a definition linkbase.

14. The computer program product of claim 9, wherein the computer usable program code is further configured to preserve the structure of the XBRL instance in a second XML document, wherein the structured XML data model instance also comprises the second XML document.

15. The computer program product of claim 14, wherein the computer usable program code is further configured to transform a second XML data model instance into a second XBRL instance using the second XML document, wherein the second XML data model instance is a modified version of the XML data model instance.

16. An apparatus comprising:

a hardware implemented processor;

a network interface coupled with the processor, the network interface operable to receive an extensible business reporting language (XBRL) instance;

an XBRL transforming engine executable by the processor, the XBRL transforming engine operable to:

for each of a plurality of concepts indicated in an XBRL schema associated with the XBRL instance, determine concept relationship information for the concept from the XBRL schema, context information indicated in the XBRL instance, and at least one of a plurality of files that constitute a taxonomy set for the XBRL instance;

determine attribute information for the concept based, at least in part, on the XBRL schema and at least one of the files that constitute the taxonomy set;

generate an XML document with XML elements structured in accordance with the concept relationship information, wherein the XML elements correspond to the plurality of concepts and have attributes set based, at least in part, on the attribute information;

populate each of the XML elements with corresponding ones of XBRL facts to yield the structured XML data model instance, wherein the XBRL instance indicates the XBRL facts and the XML data model instance comprises at least the XML document;

retrieve an XBRL dimension document via a second reference indicated in the taxonomy set, the XBRL dimension document including at least one hypercube having a plurality of dimensions;

add a parent element to an XML dimension mapping document, the parent element corresponding to the hypercube; and add to the XML dimension document one or more child elements of the parent element, the one or more child elements representing one or more dimensions in the hypercube.

17. The apparatus of claim 16, wherein the XBRL transforming engine is further operable to preserve the structure of the XBRL instance in a second XML document, wherein the structured XML data model instance also comprises the second XML document.

18. The apparatus of claim 16 further comprising a computer-readable storage medium, wherein the computer-readable storage medium has stored therein, computer usable program code that embodies the XBRL transforming engine.

* * * * *